(12) United States Patent
Balachandran et al.

(10) Patent No.: US 12,050,931 B2
(45) Date of Patent: Jul. 30, 2024

(54) SYSTEM AND METHOD FOR MIGRATING PARTIAL TREE STRUCTURES OF VIRTUAL DISKS BETWEEN SITES USING A COMPRESSED TRIE

(71) Applicant: VMware, Inc., Palo Alto, CA (US)

(72) Inventors: Vipin Balachandran, Cupertino, CA (US); Hemanth Kumar Pannem, Danville, CA (US)

(73) Assignee: VMware, Inc., Palo Alto, CA (US)

( * ) Notice: Subject to any disclaimer, the term of this patent is extended or adjusted under 35 U.S.C. 154(b) by 464 days.

(21) Appl. No.: 17/499,759

(22) Filed: Oct. 12, 2021

(65) Prior Publication Data

US 2023/0114131 A1    Apr. 13, 2023

(51) Int. Cl.
*G06F 9/455*    (2018.01)
*G06F 9/48*    (2006.01)

(52) U.S. Cl.
CPC ........ *G06F 9/4875* (2013.01); *G06F 9/45558* (2013.01); *G06F 2009/4557* (2013.01)

(58) Field of Classification Search
CPC .............. G06F 9/4875; G06F 9/45558; G06F 2009/4557
See application file for complete search history.

(56) References Cited

U.S. PATENT DOCUMENTS

| | | | |
|---|---|---|---|
| 2020/0192594 A1* | 6/2020 | Balachandran | G06F 3/0647 |
| 2021/0273807 A1* | 9/2021 | Wertheim | G06F 9/466 |
| 2021/0303534 A1* | 9/2021 | Solan | G06F 16/27 |
| 2021/0397345 A1* | 12/2021 | Jawahar | G06F 9/45558 |

* cited by examiner

*Primary Examiner* — Dong U Kim
(74) *Attorney, Agent, or Firm* — King Intellectual Asset Management

(57) ABSTRACT

System and computer-implemented method for migrating partial tree structures of virtual disks for virtual computing instances between sites in a computer system uses a compressed trie, which is created from target tree structures of virtual disks at a plurality of target sites in the computer system. For a virtual computing instance selected, the compressed trie is used to find candidate target sites based on a disk chain string of the virtual computing instance. For each candidate target site, a cost value for migrating the virtual computing instance along with a partial source tree structure of virtual disks corresponding to the virtual computing instance from the source site to the candidate target site is calculated to select a target site with a lowest cost value as a migration option to reduce storage resource usage in the computer system.

23 Claims, 15 Drawing Sheets

SYSTEM AND METHOD FOR MIGRATING PARTIAL TREE STRUCTURES OF VIRTUAL DISKS BETWEEN SITES USING A COMPRESSED TRIE

BACKGROUND

Cloud architectures are used in cloud computing and cloud storage systems for offering infrastructure-as-a-service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual computing instances (VCIs), e.g., virtual machines (VMs), and logical networks.

A cloud system may aggregate the resources from both private and public clouds. A private cloud can include one or more customer data centers (referred to herein as "on-premise data centers"). A public cloud can include a multi-tenant cloud architecture providing IaaS cloud services. In a cloud system, it is desirable to support VCI migration between the on-premise data centers and/or the public cloud for various reasons, such as workload management. Due to various operations, including VCI migrations and snapshot operations, VCIs in different computing environments, such as on-premise data centers and IaaS clouds, may include redundant virtual disks that are inefficiently distributed among the different computing environments. Thus, there is a need to reduce the redundant virtual disks in the different computing environments to utilize storage resources more efficiently in the different computing environments.

SUMMARY

System and computer-implemented method for migrating partial tree structures of virtual disks for virtual computing instances between sites in a computer system uses a compressed trie, which is created from target tree structures of virtual disks at a plurality of target sites in the computer system. For a virtual computing instance selected, the compressed trie is used to find candidate target sites based on a disk chain string of the virtual computing instance. For each candidate target site, a cost value for migrating the virtual computing instance along with a partial source tree structure of virtual disks corresponding to the virtual computing instance from the source site to the candidate target site is calculated to select a target site with a lowest cost value as a migration option to reduce storage resource usage in the computer system.

A computer-implemented method for migrating partial tree structures of virtual disks for virtual computing instances between sites in a computer system in accordance with an embodiment of the invention comprises creating a compressed trie from target tree structures of virtual disks at a plurality of target sites in the computer system, selecting a virtual computing instance at a source site for processing, determining a disk chain string of the virtual computing instance, wherein the disk chain string includes identifiers of virtual disks in a source tree structure at the source site that form a disk chain from a root node disk to a leaf node disk corresponding to the virtual computing instance, finding candidate target sites using the compressed trie based on the disk chain string of the virtual computing instance at the source site, for each candidate target site, calculating a cost value for migrating the virtual computing instance along with a partial source tree structure of virtual disks corresponding to the virtual computing instance from the source site to the candidate target site, and selecting a target site with a lowest cost value among the candidate target sites as a migration option for migrating the virtual computing instance and the partial source tree structure of virtual disks to reduce storage resource usage in the computer system. In some embodiments, the steps of this method are performed when program instructions contained in a computer-readable storage medium are executed by one or more processors.

A system in accordance with an embodiment of the invention comprises memory and one or more processors configured to create a compressed trie from target tree structures of virtual disks at a plurality of target sites in a computer system, select a virtual computing instance at a source site for processing, determine a disk chain string of the virtual computing instance, wherein the disk chain string includes identifiers of virtual disks in a source tree structure at the source site that form a disk chain from a root node disk to a leaf node disk corresponding to the virtual computing instance, find candidate target sites using the compressed trie based on the disk chain string of the virtual computing instance at the source site, for each candidate target site, calculate a cost value for migrating the virtual computing instance along with a partial source tree structure of virtual disks corresponding to the virtual computing instance from the source site to the candidate target site, and select a target site with a lowest cost value among the candidate target sites as a migration option for migrating the virtual computing instance and the partial source tree structure of virtual disks to reduce storage resource usage in the computer system.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
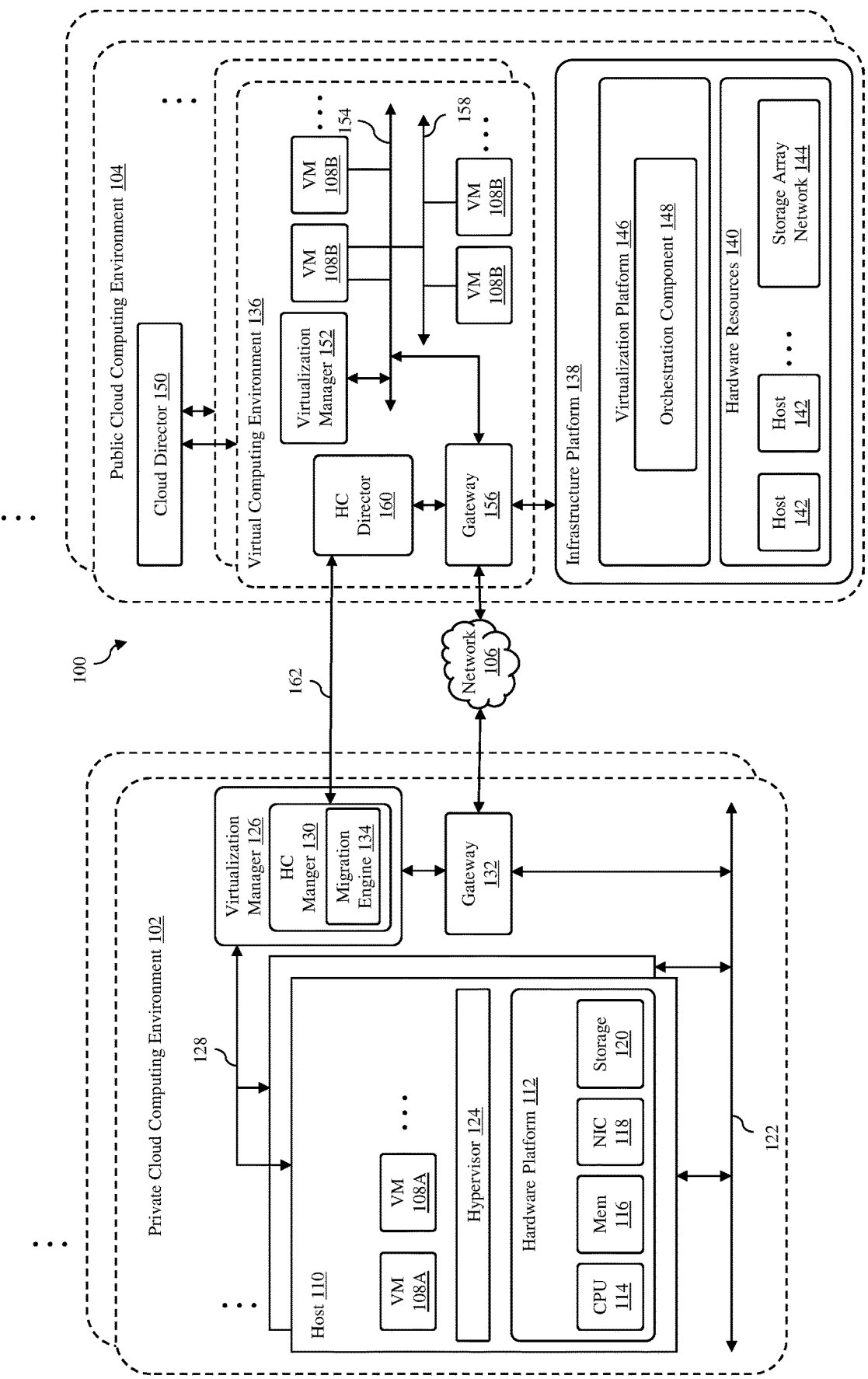
FIG. 1 is a block diagram of a cloud system in accordance with an embodiment of the invention.

Turning now to FIG. 1, a block diagram of a cloud system 100 in accordance with an embodiment of the invention is shown. The cloud system 100 includes one or more private cloud computing environments 102 and/or one or more public cloud computing environments 104 that are connected via a network 106. The cloud system 100 is configured to provide a common platform for managing and executing workloads seamlessly between the private and public cloud computing environments. In one embodiment, one or more private cloud computing environments 102 may be controlled and administrated by a particular enterprise or business organization, while one or more public cloud computing environments 104 may be operated by a cloud computing service provider and exposed as a service available to account holders, such as the particular enterprise in addition to other enterprises. In some embodiments, each private cloud computing environment 102 may be a private or on-premise data center.

The private and public cloud computing environments 102 and 104 of the cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

As explained below, the cloud system 100 supports migration of the virtual machines 108A and 108B between any of the private and public cloud computing environments 102 and 104. The cloud system 100 may also support migration of the virtual machines 108A and 108B between different sites situated at different physical locations, which may be situated in different private and/or public cloud computing environments 102 and 104 or, in some cases, the same computing environment.

As shown in FIG. 1, each private cloud computing environment 102 of the cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

Each private cloud computing environment 102 includes a virtualization manager 126 that communicates with the hosts 110 via a management network 128. In an embodiment, the virtualization manager 126 is a computer program that resides and executes in a computer system, such as one of the hosts 110, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment 102, including managing the hosts, managing the virtual machines running within each host, provisioning virtual machines, migrating virtual machines from one host to another host, and load balancing between the hosts.

In one embodiment, the virtualization manager 126 includes a hybrid cloud (HC) manager 130 configured to manage and integrate computing resources provided by the private cloud computing environment 102 with computing resources provided by one or more of the public cloud computing environments 104 to form a unified "hybrid" computing platform. The hybrid cloud manager is configured to deploy virtual computing instances, e.g., virtual machines 108A, in the private cloud computing environment, transfer virtual machines from the private cloud computing environment to one or more of the public cloud computing environments, and perform other "cross-cloud" administrative tasks. In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

In the illustrated embodiment, the HC manager 130 further includes a migration engine 134, which performs operations related to reducing storage resource usage by migrating virtual machines between different sites to reduce redundant virtual disks at the different sites in the cloud system 100. Although the migration engine 134 is shown to reside in the hybrid cloud manager 130, the migration engine may reside anywhere in the cloud system 100 in other embodiments. The migration engine 134 and its operations will be described in detail below.

In one embodiment, the hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

Each public cloud computing environment 104 of the cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. Each public cloud computing environment includes an infrastructure platform 138 upon which the virtual computing environments can be executed. In the particular embodiment of FIG. 1, the infrastructure platform 138 includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate virtual machines according to a requested template that defines one or more virtual machines having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environments 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, each public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environments 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environments 102 via the network 106. The gateway device 156 operates in a similar manner as the gateway device 132 in the private cloud computing environments.

In one embodiment, each virtual computing environments 136 includes a hybrid cloud (HC) director 160 configured to communicate with the corresponding hybrid cloud manager 130 in at least one of the private cloud computing environments 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director 160 may be a component of the HCX-Cloud product and the hybrid cloud manager 130 may be a component of the HCX-Enterprise product, which are provided by VMware, Inc.

In the illustrated embodiment, the cloud system 100 supports linked cloning, such as VMware vSphere® technology used for fast cloning of virtual machines from a source or base virtual machine. Linked cloning technology is often used in Infrastructure as a Service (IaaS) solutions, such as VMware vCloud Director® (vCD), VMware® Integrated OpenStack (VIO) and Desktop as a Service (DaaS) solution named VMware Horizon®. Using linked cloning technology, users can provision a virtual machine from a source virtual machine in just few seconds.

Linked cloning in the cloud system 100 uses snapshot technology, for example, VMware vSphere® snapshot technology. When a snapshot of a virtual machine is taken, all the virtual disks of the virtual machine are marked as read-only and a new virtual disk is created to track new writes. This new virtual disk, which is sometimes referred to as a delta disk or redo log disk, points to the read-only disk (base disk) to form a parent-child relationship. For a read operation, the data is first read from the child disk. If there is a miss, the read operation is attempted on the parent disk. It is possible to create multiple snapshots of a VM, where each snapshot operation marks its current disk as read-only and creates a child delta disk to track new writes.

Figure 2:
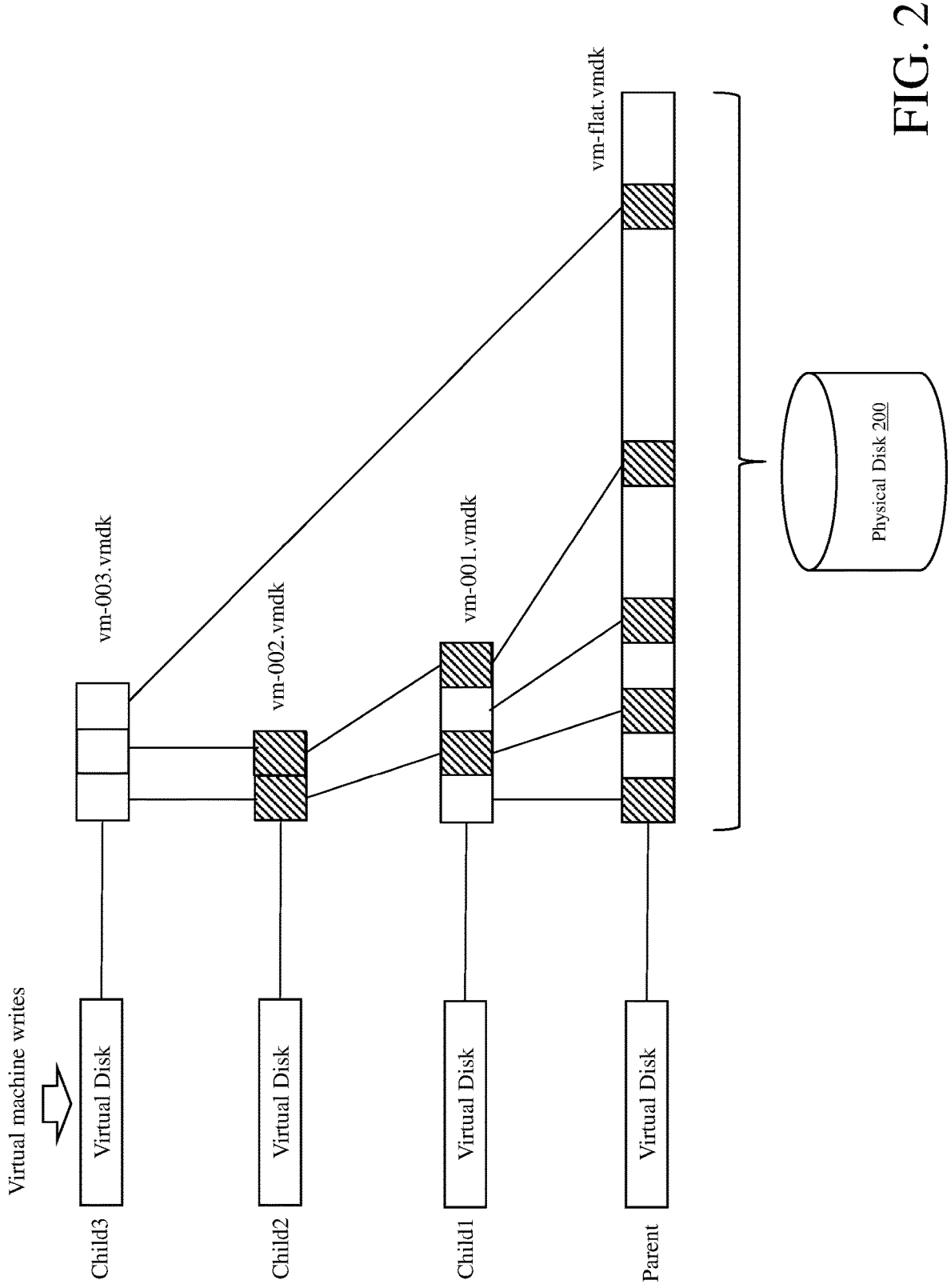
FIG. 2 is an example of a virtual machine with three snapshots in accordance with an embodiment of the invention.

An example of a virtual machine with three snapshots is illustrated in FIG. 2. In this example, the virtual machine has four virtual disks, which include a parent virtual disk and three child virtual disks Child1, Child2 and Child3. These virtual disks are stored in a physical disk 200 as files. In this example, the parent virtual disk is stored as a vm-flat.vmdk file and the three child virtual disks are stored as vm-001.vmdk, vm-002.vmdk and vm-003.vmdk. The parent virtual disk and the child virtual disks Child1 and Child2 are read-only disks. Thus, in this example, the virtual machine writes only to the virtual disk Child3.

Linked cloning works by creating a snapshot of the source virtual machine and then creating a target virtual machine with a delta disk pointing to the read-only base disk of the source virtual machine. Since the base disk is read-only, the base disk can be shared between the source and target virtual machines for read operations. Also, since the delta disk is used to track only new writes, the delta disk starts off with a size of few megabytes (MBs). Therefore, linked cloning is a fast operation which takes only a few seconds compared to several minutes needed to create a full copy of virtual disks for traditional virtual machine clone operation. The target virtual machine is often referred as a linked clone virtual machine or simply a linked clone. Once a virtual machine is snapshotted, multiple virtual machines can be cloned from its snapshot. Also, a virtual machine which is a linked clone can serve as the source virtual machine of other linked clones, thereby creating a tree of related virtual machines called a linked clone tree.

Figure 3:
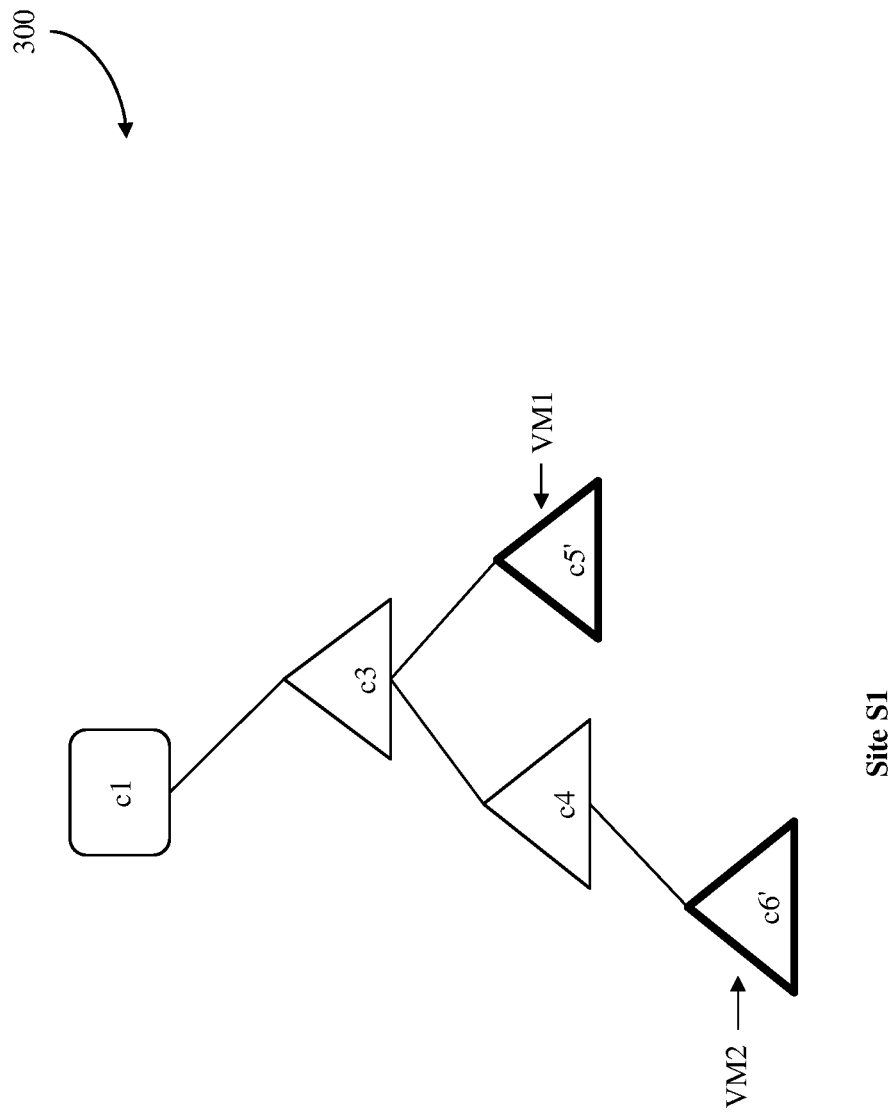
FIG. 3 is an example of a linked clone tree for two virtual machines and at a site in accordance with an embodiment of the invention.

Turning now to FIG. 3, an example of a linked clone tree 300 for two virtual machines VM1 and VM2 at a site S1 in accordance with an embodiment of the invention is illustrated. As shown in FIG. 3, the linked clone tree 300 includes a read-only base virtual disk c1, read-only virtual disks c3 and c4 and delta virtual disks c5' and c6'. The delta virtual disk c5' is used by the virtual machine VM1 for new writes, while the delta disk c6' is used by the virtual machine VM2 for new writes. Thus, as used herein, the virtual machine VM1 is said to correspond to the delta virtual disk c5' and the virtual machine VM2 is said to correspond to the delta virtual disk c6'. The disk labels used in FIG. 3 (i.e., c1, c3, c4, c5' and c6') represent content identifiers (IDs) of the virtual disks. In an embodiment, each content ID is a unique hexadecimal string assigned to each virtual disk by a virtualization software, e.g., VMware vSphere® software. The site S1 may be located in any computing environment, such as one of the private cloud computing environments 102 or one of the virtual computing environments 136 in one of the public cloud computing environments 104 of the cloud system 100.

Figure 4:
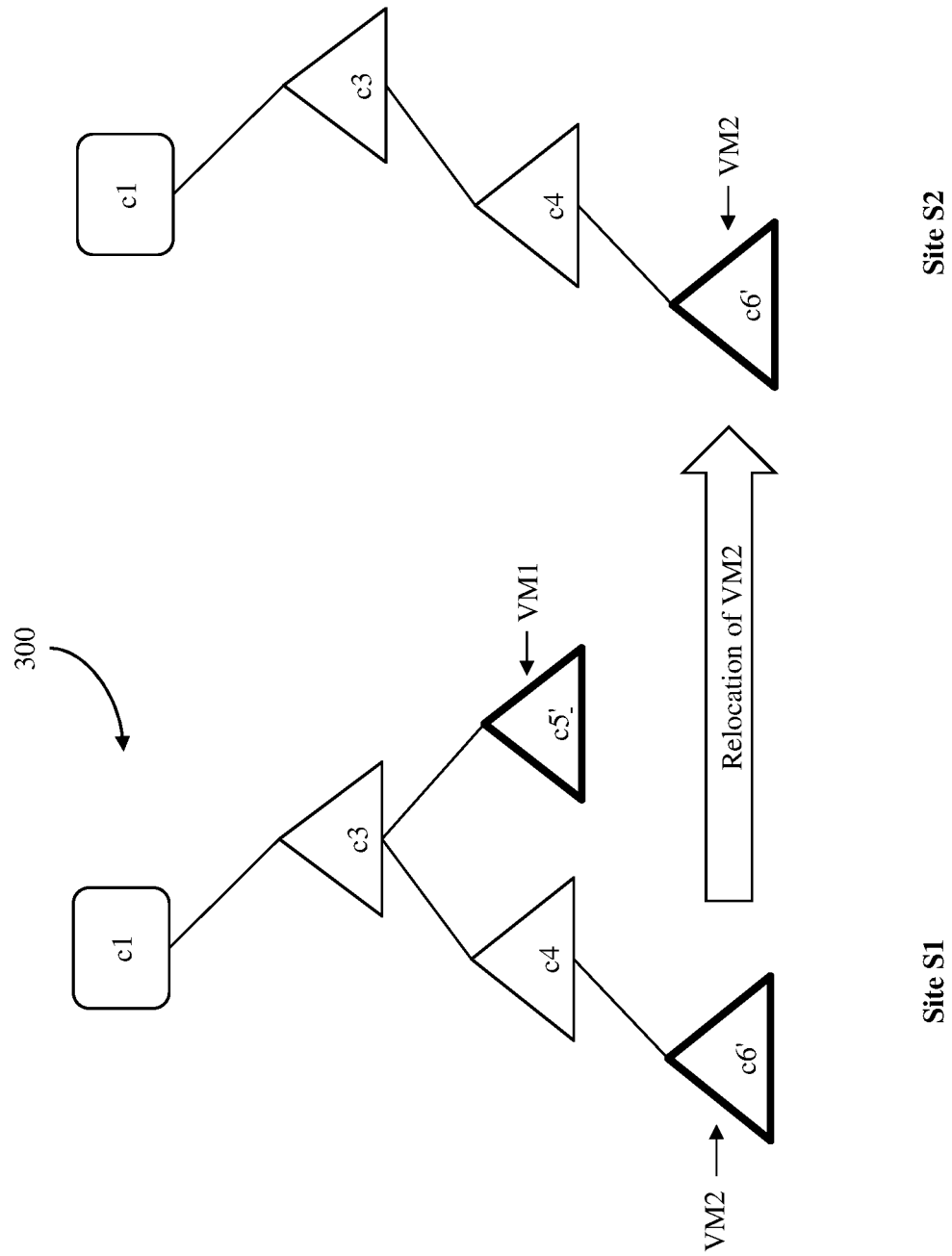
FIG. 4 shows a virtual machine being relocated from a site to a new site in accordance with an embodiment of the invention.

The cloud system 100 supports relocation of a virtual machine from one site to another site, where the parent-child relationships are retained between all its disks at the new site. Such relocation results in duplicate disks with the same content ID in various sites. This is illustrated in FIG. 4, which shows the virtual machine VM2 depicted in FIG. 3 being relocated from the site S1 to a new site S2. In some scenarios, the new site S2 may be located in the same computing environment, where the source site is a storage unit, e.g., a datastore, in the computing environment and the destination or target site is another storage location, e.g., a different datastore, in the same computing environment.

Figure 5:
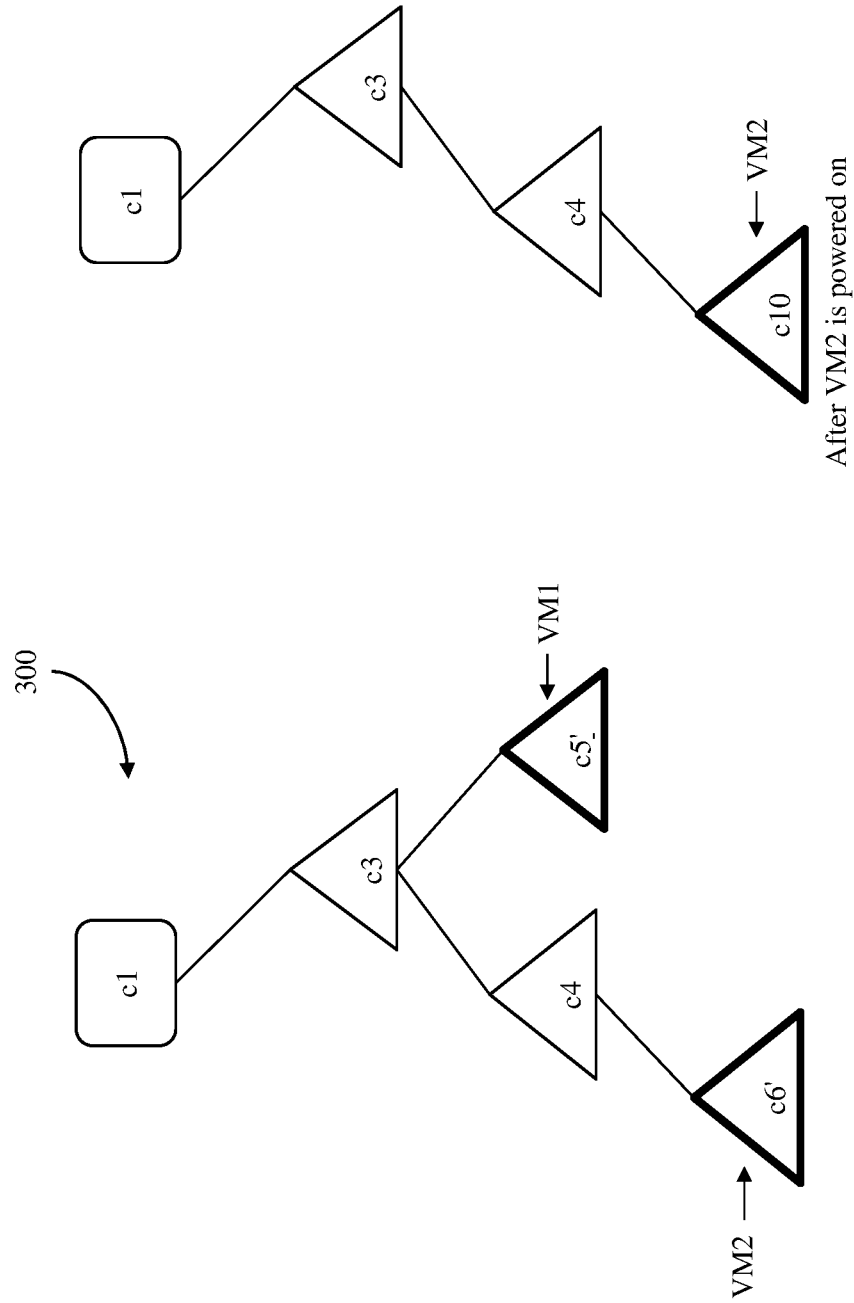
FIG. 5 shows the content identifier (ID) being changed for a virtual disk corresponding to a virtual machine after the virtual machine is powered on after the virtual machine has been migrated to a target site in accordance with an embodiment of the invention.

As shown in FIG. 4, the relocation of the virtual machine VM2, i.e., the virtual machine corresponding to the virtual disk c6', from the source site S1 to a destination site S2 results in copies of the virtual disks c1, c3, c4 and c6' at the destination site S2. This virtual relocation process can be viewed as a virtual machine cloning process, i.e., cloning a virtual machine from the source site S1 to the target site S2. Once the virtual machine corresponding to the disk c6' is powered on, the content ID of the disk changes, as illustrated in FIG. 5, from "c6"' to a new content ID, which in this example is "c10".

After several such cycles of snapshot-linked cloning-relocate operations, there can be a significant number of duplicate virtual disks across various sites. In order to reduce storage consumption, a disk chain consolidation can be executed on linked clone trees of virtual disks. A disk chain consolidation is an operation that merges data of several virtual disks in a linked clone tree to save storage space.

Figure 6:
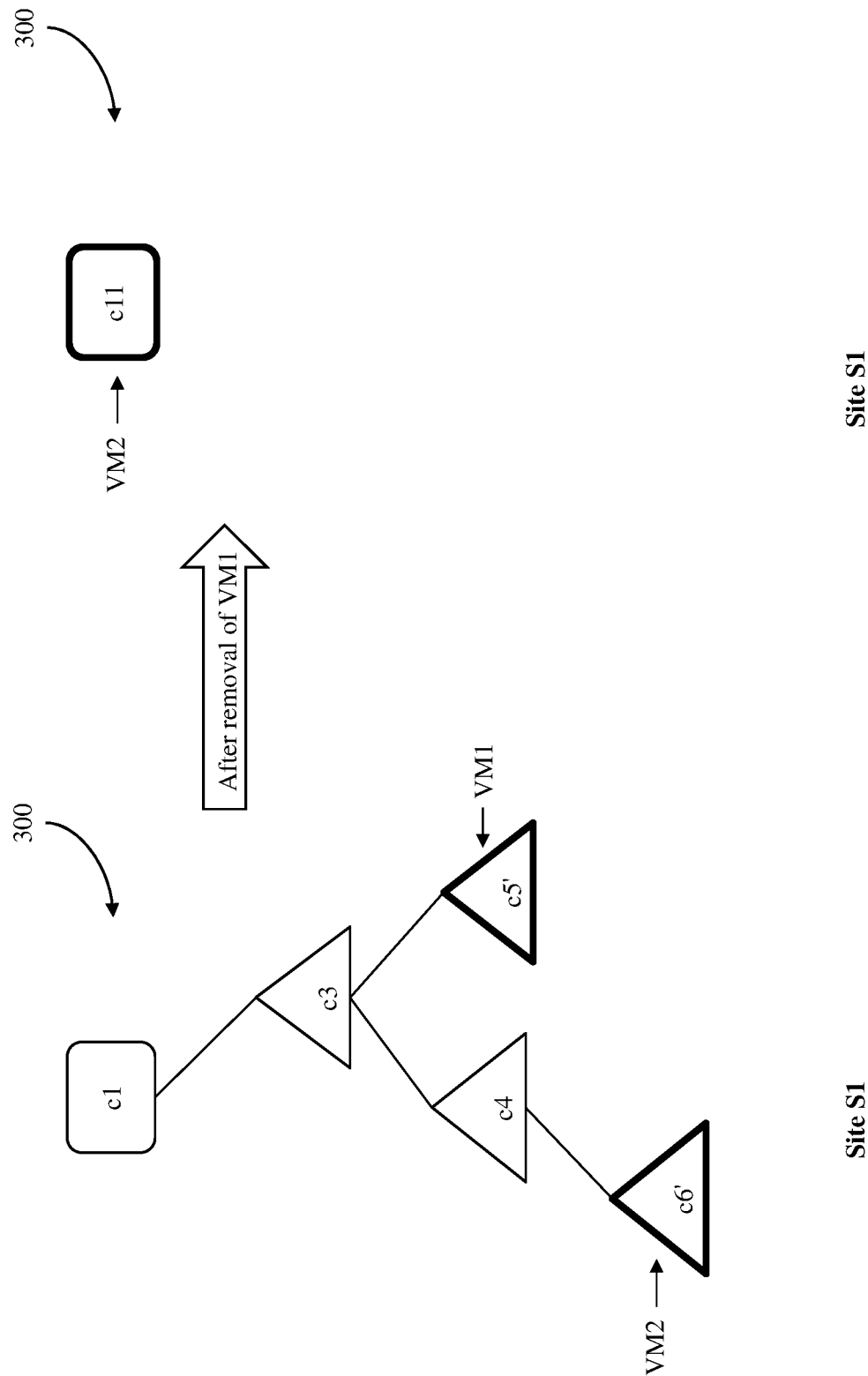
FIG. 6 illustrates a consolidation of virtual disk into a single new disk after removal of a virtual machine in accordance with an embodiment of the invention.

The disk chain consolidation operation is described using the linked clone tree 300 shown in FIG. 3 as an example. In the linked clone tree 300 depicted in FIG. 3, if the virtual machine VM1 corresponding to the virtual disk c5' is removed, the contents of the virtual disks c3, c4 and c6' can be merged with the disk c1 to form a single disk, thereby saving storage space by removing redundant blocks, which is illustrated in FIG. 6. As shown in FIG. 6, after removal of the virtual machine VM1 corresponding to the virtual disk c5', the virtual disks c1, c3, c4 and c6' have been consolidated into a single new disk c11, which includes the contents of the virtual disks c1, c3, c4 and c6'.

It is a common operation in a hybrid cloud environment to relocate virtual machines using solutions, such as VMware's HCX solution, from one site to another to optimize various metrics. However, in this disclosure, the optimization of storage cost is being addressed. Consider the problem of freeing up storage space at a source site by migrating virtual machines to one or more candidate target sites. This may be done to reduce the overall storage cost incurred across all sites. This problem is non-trivial when there are linked clone trees and duplicate virtual disks across sites. The challenges include (1) how to choose a subset of virtual machines in a linked clone tree, and (2) how to select the target sites. Ideally, these two questions need to be addressed with the goal of reducing the overall storage cost.

The formal problem statement being addressed by embodiments of the invention is: "Given a source site with a collection of linked clone trees and a list of target sites, find a subset of linked clone virtual machines to migrate from the source site to target sites such that the overall storage cost is reduced." It is important to note that a solution to this problem must be scalable to handle cloud-scale environments to be useful.

The cloud system 100 employs a greedy approach to solve the above problem. Since virtual disks and disk chains for virtual machines may be duplicated across different sites, as discussed before, intuitively, identifying such disk chains and relocating the corresponding virtual machines would reduce the storage consumption at the source site without increasing the storage consumption at the target sites.

Figure 7:
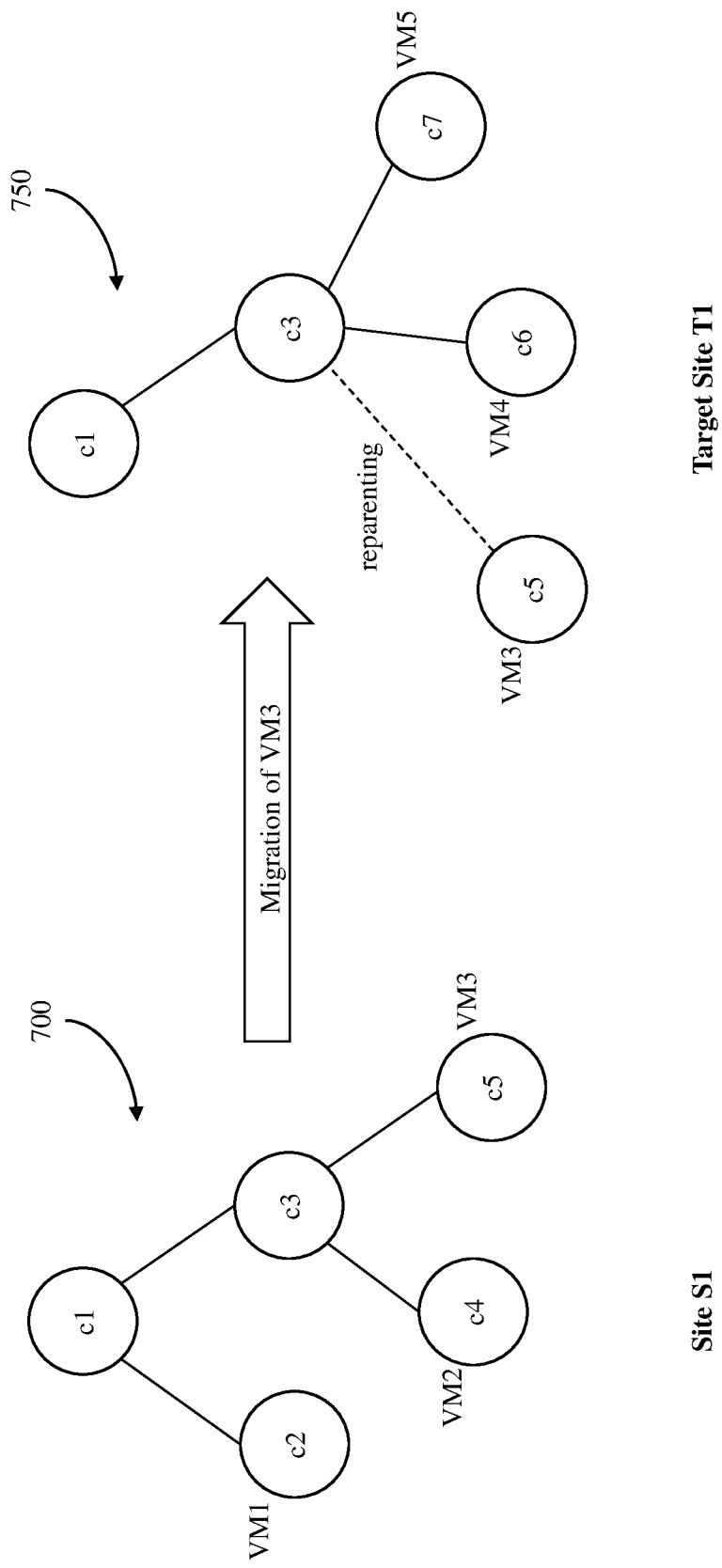
FIG. 7 is a diagram of a linked clone tree at a site in accordance with an embodiment of the invention.

As previously discussed, a linked clone tree can be represented by a tree where each node is labelled using the content ID of the corresponding virtual disk. Another such linked clone tree 700 at a site S1 is illustrated in FIG. 7 in accordance with an embodiment of the invention. In the linked clone tree 700, leaf nodes c2, c4 and c5 correspond to virtual machines VM1, VM2 and VM3, as indicated in FIG. 7. In this example, the virtual machine VM3 is represented by the following sequence of node labels (from the root node to the leaf node): c1-c3-c5. Let's assume that there exists a virtual machine VM4 in a linked clone tree 750 at a target site T1 with the following node label sequence: c1-c3-c6, along with a virtual machine VM5. In this scenario, migrating the virtual machine VM3 to the target site T1 would only require copying the delta disk c5 and changing the parent virtual disk of the cloned disk to the virtual disk c3, as illustrated in FIG. 7. This operation of modifying the parent of a delta disk at a target site is called reparenting in a VMware vSphere® environment.

It is intuitive to reduce the problem of finding such duplicate disk chains in linked clone trees across source and target sites to tree label pattern matching problem. However, this is a very expensive operation for large number of linked clone trees with thousands of nodes, which are typical for cloud scale environments. To scale this tree matching to cloud computing environments, this problem should be further reduced.

As discussed above, content IDs of virtual disks may be unique hexadecimal strings. Let's assume that the content IDs of the virtual disks c1, c3, c5 and c6 are as follows: c1=12345, c3=abcde, c5=67890 and c6=f0123. The disk chain for the virtual machine VM3 (c1-c3-c5) in the above example can now be represented by the following hexadecimal string: 12345-abcde-67890. Similarly, the disk chain for the virtual machine VM4 (c1-c3-c6) in the target site T1 can be represented as follows: 12345-abcde-f0123.

Using such representation, the problem of finding tree label matching can be reduced to string prefix matching. Since the goal is to match the largest prefix (i.e., the maximum number of delta virtual disks at the target site), the problem is further reduced to longest prefix matching for which using a trie is ideal. A trie is a tree data structure for efficient string retrieval. Each edge in the trie is associated with a character and a node represents the string which is the concatenation of labels of the edges in the path from the root node to that node. The root node represents an empty string.

Figure 8:
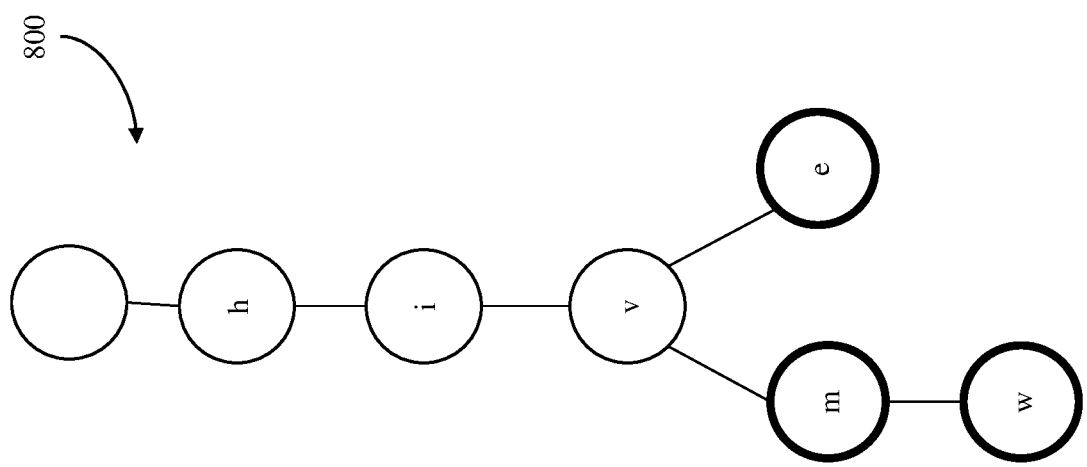
FIG. 8 is an example of a trie that represents three strings, "hi vm", "hive" and "hi vmw" in accordance with an embodiment of the invention.

As example of a trie 800 that represents three (3) strings, "hi vm", "hive" and "hi vmw", is shown in FIG. 8. For simplicity, in FIG. 8, each edge label has been added to the node at which the edge terminates. In this example, nodes labeled "e", "m" and "w" represent the 3 strings. As illustrated in FIG. 8, a non-leaf node can represent the prefix of all strings represented by its descent nodes. For example, the node labeled "v" represents the string "hiv" and is the prefix of strings "hive", "hivm" and "hivmw", which are presented by its descent nodes labeled "e", "m" and "w", respectively.

Figure 9:
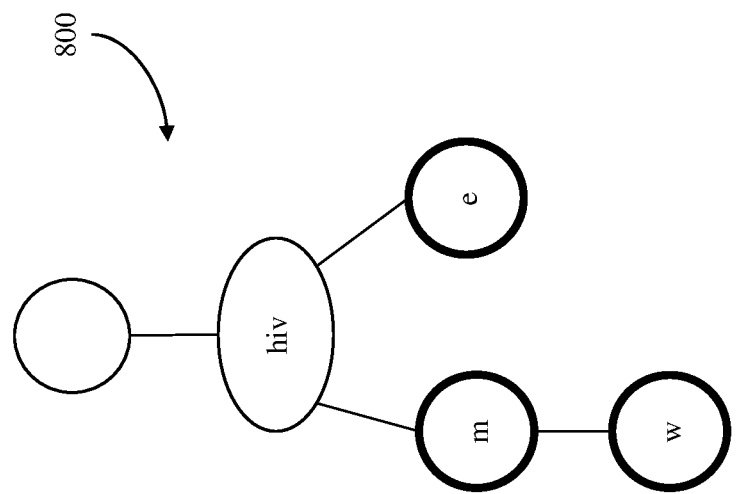
FIG. 9 shows a compressed trie, where the non-leaf nodes labeled "h", "i" and "v" in a trie, have been collapsed into a single branch node labeled "hiv" to save memory in accordance with an embodiment of the invention.

Without losing any information, only non-leaf nodes of a trie that do not represent a string can be collapsed. Thus, for the trie 800, the non-leaf nodes labeled "h", "i" and "v" 800 can be collapsed into a single branch node labeled "hiv" to save memory, as illustrated in FIG. 9. This variant of a trie is referred to herein as a compact prefix tree or a compressed trie. It is noted here that, in the illustrated example, the nodes "e", "m" and "w" are special nodes that cannot be compressed together because each of these nodes represents one of the strings "hive", "hivm" and "hivmw".

Figure 10:
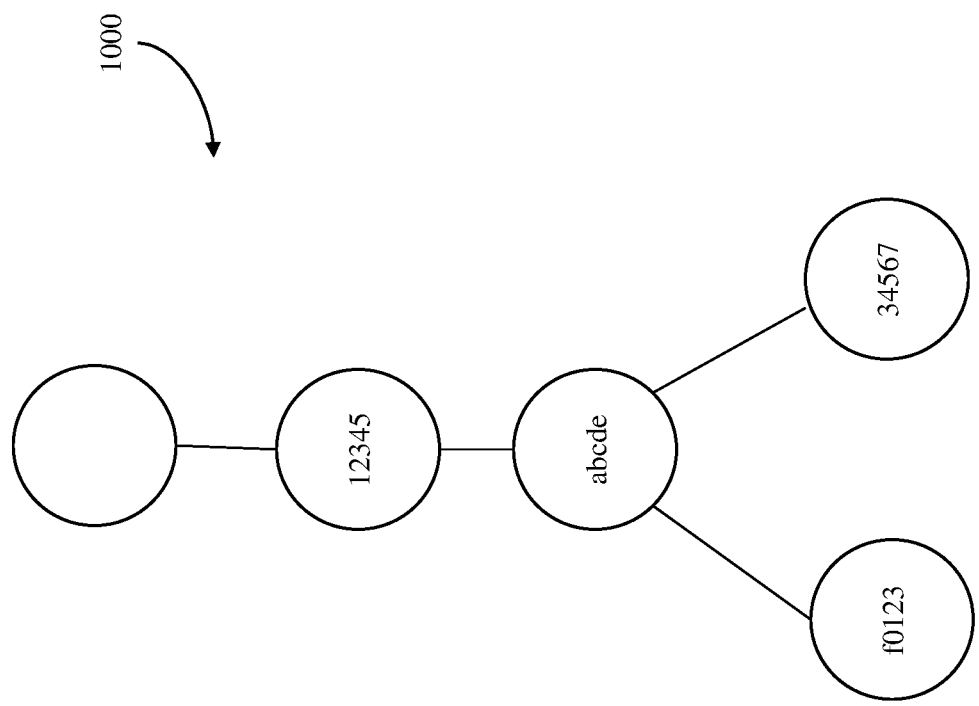
FIG. 10 shows linked clone trees at target sites that are represented as a compressed trie in accordance with an embodiment of the invention.

Any linked clone tree can be represented as a compressed trie. For example, the linked clone tree 750 at the target site T1 shown in FIG. 7 (before relocation of the virtual machine VM3 and assuming the content ID of c7=34567) can be represented as a compressed trie 1000, as illustrated in FIG. 10.

Since a greedy approach is being used, a cost function is needed to rank candidate virtual machines at the source site that should be migrated to target sites. Since storage cost is being optimized, it is intuitive to use virtual disk size and cost per unit of storage, such as gigabyte (GB), as one of the parameters, because there would be a reduction of cost for network transfer as less bytes of data are transferred. In addition, cost savings should be factored in due to virtual disk consolidation after migration. After migrating a disk chain, one or more virtual disks in the same tree may be redundant and can be merged to reclaim storage. Formally, the cost function for a given virtual machine "vm" is defined as follows:

$$\text{cost}(vm, s, t) = \sum_{i=m}^{n} diskCost(c_i, t) - \sum_{j=p}^{q} diskCost(c_j, s) - \emptyset(vm),$$

where s is the source site, t is the target site, $c_i$ is a disk in a disk chain at the target site, $c_j$ is a virtual disk in the disk chain at the source site, diskCost is a function that computes its cost by multiplying the per GB storage cost at the given site by size of the virtual disk, and $\emptyset(vm)$ is the cost savings due to disk consolidation at the source site by the removal of the virtual machine "vm". The first component of the equation computes the additional storage incurred at the target site due to the migration of the virtual machine "vm" to that site. The virtual disks $c_m$ to $c_n$ are not present at the target site, and hence, these virtual disks must be copied to the target site in order to migrate the virtual machine "vm". The second component of the equation accounts for the storage savings due to the removal of the virtual machine "vm" from the source site. The disks $c_p$ to $c_q$ are not used by any virtual machines at the source site and hence can be removed. The last part of the equation is the cost savings at the source site due to disk consolidation by the removal of the virtual machine "vm". In the cost function equation, a duration parameter could be added to the diskCost function to compute the per GB cost for that duration. However, it is assumed to be fixed for the sake of simplicity.

Figure 11:
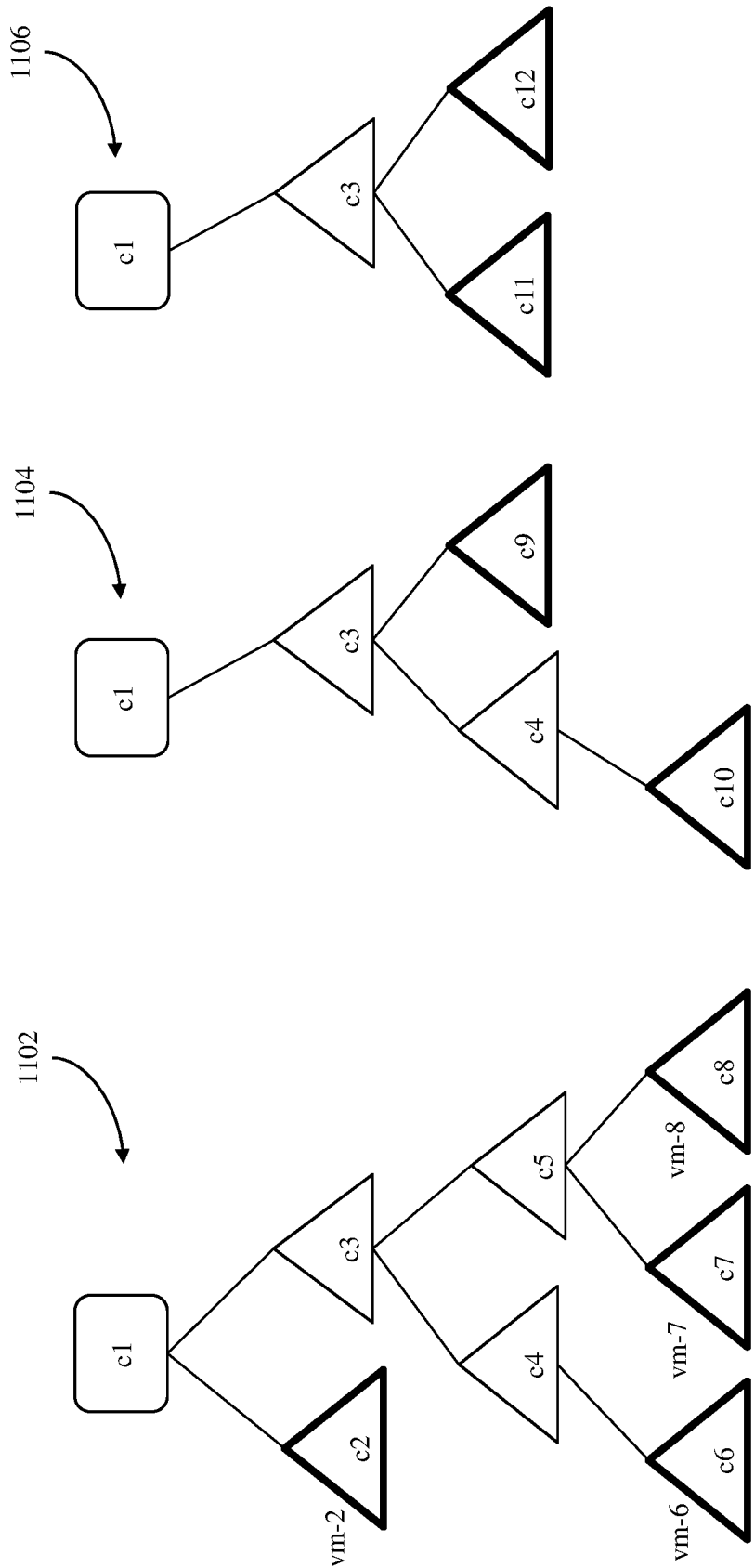
FIG. 11 shows linked clone trees at a source site and target sites in accordance with an embodiment of the invention.

The greedy algorithm used in the cloud system 100 in accordance with an embodiment of the invention is described using an example illustrated in FIG. 11, which shows a source site S1 and two target sites T1 and T2. The source site S1 includes a linked clone tree 1102 that includes a root virtual disk c1, non-leaf virtual disks c3, c5 and c5 and leaf virtual disks c2, c6, c7 and c8, which correspond to virtual machines vm-2, vm-6, vm-7 and vm-8, respectively. The target site T1 includes a linked clone tree 1104 that includes a root virtual disk c1, non-leaf virtual disks c3 and c4, and leaf virtual disks c9 and c10, which correspond to two virtual machines (not labeled in FIG. 11). The target site T2 includes a linked clone tree 1106 that includes a root virtual disk c1, a non-leaf virtual disk c3, and leaf virtual disks c11 and c12, which correspond to two virtual machines (not labeled in FIG. 11).

Figure 12:
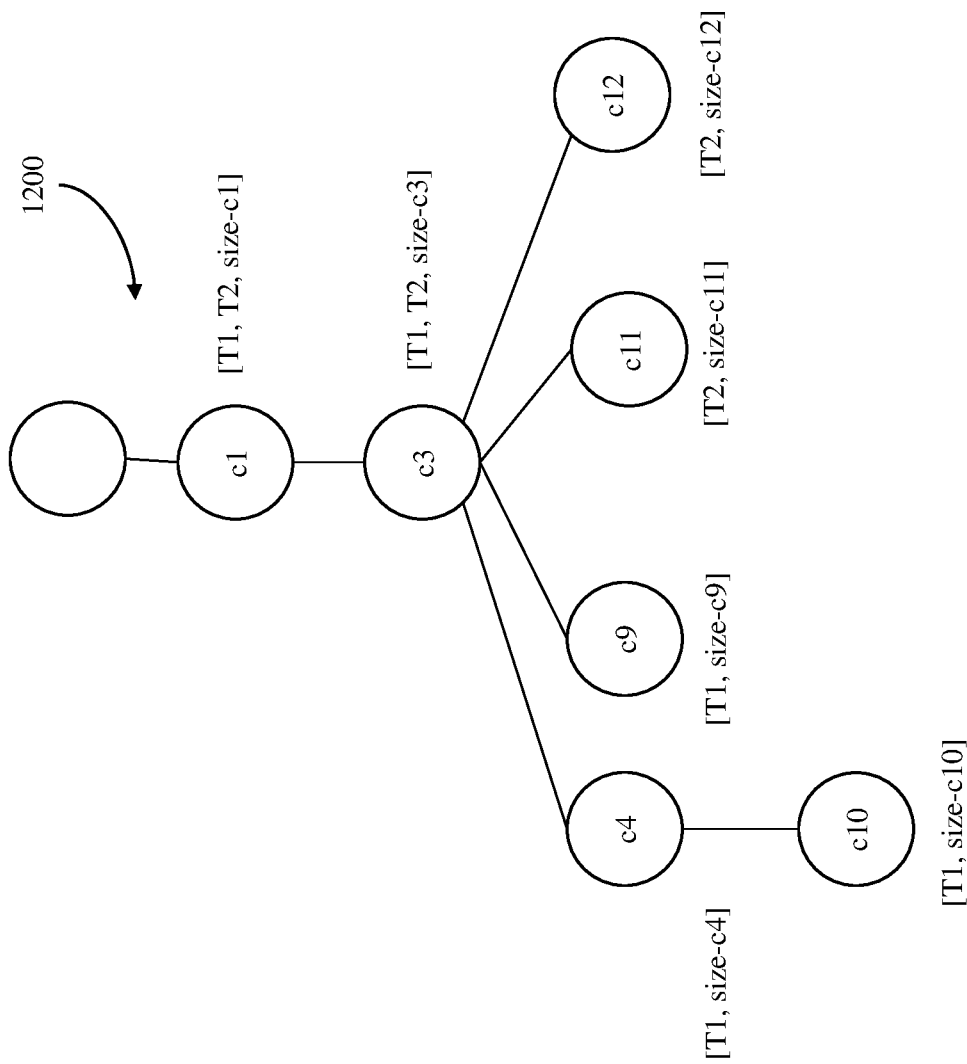
FIG. 12 shows a compressed trie that represents the linked clone trees at the target sites shown in FIG. 11 in accordance with an embodiment of the invention.

The first step of the greedy algorithm is to create a compressed trie to represent all target linked clone trees. A compressed trie 1200 that represents the linked clone trees 1104 and 1106 at the target sites T1 and T2 is illustrated in FIG. 12. In an embodiment, as shown in FIG. 12, each node of the compressed trie 1200 (except for the root node) includes the following fields: (1) sites in which the node appear, and (2) corresponding virtual disk size.

The next step of the greedy algorithm is to iterate over each of the leaf nodes or virtual disks (which correspond to virtual machines) in the linked clone tree at the source site and compute the storage cost involved in relocating it to one of the target sites. Relocating a virtual machine from a source site to a target site involves moving the virtual machine and a corresponding partial linked clone tree of the linked clone tree at the source site. The partial linked clone tree that corresponds to a virtual machine is a portion of the linked clone tree at the source site that is only used by that virtual machine, which includes the delta disk corresponding to the virtual machine and any non-leaf nodes that are only connected to the delta disk corresponding to the virtual machine and no other delta disk that corresponds to another virtual machine. For simplicity, it is assumed here that each of the disk is of size 1 GB and cost is 1$ per GB for a month. The greedy algorithm may be programmed to visit the leaf nodes in any order. However, in an embodiment, the greedy algorithm uses level order traversal in which the algorithm visits all virtual machines in level 1 before visiting virtual machines in level 2 and so on. As used herein, the root node of a linked clone tree is at level 0 and the next level is level 1, which is followed by level 2, and so on.

In the example illustrated in FIG. 11, the first virtual machine visited by the greedy algorithm is the virtual machine vm-2 on level 1, which has a disk chain of "c1c2". Then, the maximum prefix of this disk chain in the compressed trie 1200 is determined by the greedy algorithm. In this example, the maximum prefix of the "c1c2" disk chain in the compressed trie 1200 is "c1", which is represented by the single node c1. This node c1 is present in both target sites T1 and T2.

For moving the virtual machine vm-2 and a corresponding partial linked clone tree of the linked clone tree 1102 (i.e., the disk c2) to the target site T1, which is the first migration option for this example, the cost value is: Cost(vm-2, S1, T1)=1−1−1=−1. Specifically, the cost incurred at the target site T1 due to the new disk c2 is $1 and the cost savings at the source site S1 due to the removal of the disk c2 is $1. In addition, the savings due to consolidation of disks c1 and c3 at the source site S1 is $1. That is, after the removal of the disk c2 at the source site S1, the disk chain c1-c3 (each with 1 GB size) is redundant and can be merged to a single disk with 1 GB, thereby removing 1 GB of redundant data, which results in the cost savings of $1.

The cost value for moving the virtual machine vm-2 and the corresponding partial linked clone tree of the linked clone tree 1102 (i.e., the disk c2) to the target site T2, which is the second migration option for this example, is the same as the cost value for moving the virtual machine vm-2 to the target site T1. For moving the virtual machine vm-2 to the target site T2, the cost value is: Cost(vm-2, S, T2)=1−1−1=−1.

The next virtual machine visited by the greedy algorithm is the virtual machine vm-6 on level 3, which has a disk chain of "c1c3c4c6". The maximum prefix of this disk chain in the compressed trie is "c1c3c4", which is represented by the nodes c1, c3 and c4. These nodes c1, c3 and c4 are present in only the target site T1.

For moving the virtual machine vm-6 and a corresponding partial linked clone tree of the linked clone tree 1102 (i.e., the disks c4 and c6) to the target site T1, which is the third migration option for this example, the cost value is: Cost(vm-6, S, T1)=1−2−1=−2. Specifically, the cost incurred at the target site T1 due to the new disk c6 is $1 and the cost savings at the source site S1 due to the removal of the disks c4 and c6 is $2. The disk c4 can be removed from the source site S1 since this disk is only used by the virtual machine vm-6. In addition, the savings due to consolidation of disks c3 and c5 at the source site S1 is $1. That is, after the removal of the disks c4 and c6 at the source site S1, the disk chain c3-c5 (each disk with 1 GB size) is redundant and can be merged to a single disk with 1 GB, thereby removing 1 GB of redundant data, which results in the cost savings of $1.

The next virtual machine visited by the greedy algorithm is the virtual machine vm-7 on level 3, which has a disk chain of "c1c3c5c7". The maximum prefix of this disk chain in the compressed trie is "c1c3", which is represented by the nodes c1 and c3. These nodes c1 and c3 are present in both target sites T1 and T2.

For moving the virtual machine vm-7 and a corresponding partial linked clone tree of the linked clone tree 1102 (i.e., the disk c7) to the target site T1, which is the fourth migration option for this example, the cost value is: Cost(vm-7, S1, T1)=2−1−1=0. Specifically, the cost incurred at the target site T1 due to the new disks c5 and c7 is $2 and the cost savings at the source site S1 due to the removal of the disk c7 is $1. In addition, the savings due to consolidation of the disks c5 and c8 into a new disk at the source site S1 is $1. That is, after the removal of the disk c7 at the source site S1, the disk chain c5-c8 (each disk with 1 GB size) can be merged into a new disk with 1 GB, thereby removing 1 GB of redundant data, which results in the cost savings of $1.

The cost value for moving the virtual machine vm-7 and the corresponding partial linked clone tree of the linked clone tree 1102 (i.e., the disk c7) to the target site T2, which is the fifth migration option for this example, is the same as the cost value for moving the virtual machine vm-7 to the target site T1. For moving the virtual machine vm-7 to the target site T2, the cost value is: Cost(vm-7, S1, T2)=2−1−1=0.

The next virtual machine visited by the greedy algorithm is the virtual machine vm-8 on level 3, which has a disk chain of "c1c3c5c8". The maximum prefix of this disk chain in the compressed trie is "c1c3", which is represented by the nodes c1 and c3. These nodes c1 and c3 are present in both target sites T1 and T2.

Similar to virtual machine vm-7, the cost value for moving the virtual machine vm-8 and a corresponding partial linked clone tree of the linked clone tree 1102 (i.e., the disk c8) to the target site T1, which is the sixth migration option for this example, is: Cost(vm-8, S, T1)=2−1−1=0. The cost value for moving the virtual machine vm-8 and the corresponding partial linked clone tree of the linked clone tree 1102 (i.e., the disk c8) to the target site T2, which is the seventh migration option for this example, is the same as the cost value for moving the virtual machine vm-8 to the target site T1. The cost value for moving the virtual machine vm-8 to the target site T2 is: Cost(vm-8, S1, T2)=2−1−1=0.

All the cost value calculations are listed below:

$Vm\text{-}2$ to $T1$:Cost($vm\text{-}2,S1,T1$)=1−1−1=−1, $VM\text{-}2$ to $T2$:Cost($vm\text{-}2,S1,T2$)=1−1−1=−1, $Vm\text{-}6$ to $T1$:Cost($vm\text{-}6,S1,T1$)=1−2−1=−2, $Vm\text{-}7$ to $T1$:Cost($vm\text{-}7,S1,T1$)=2−1−1=0, $Vm\text{-}7$ to $T2$:Cost($vm\text{-}7,S1,T2$)=2−1−1=0, $Vm\text{-}8$ to $T1$:Cost($vm\text{-}8,S1,T1$)=2−1−1=0, and $Vm\text{-}8$ to $T2$:Cost($vm\text{-}8,S1,T2$)=2−1−1=0.

It is clear from the above calculations that migrating the virtual machine vm-6 to the target site T1 is the clear winner. The next step of the greedy algorithm is to recompute the trie assuming that the virtual machine vm-6 has been migrated from the source site S1 to the target site T1 so that the presence of its disk chain in the target site T1 could affect the cost of virtual machines at the source site S1 in the next iteration. The recomputed trie 1300 is illustrated in FIG. 13.

Figure 13:
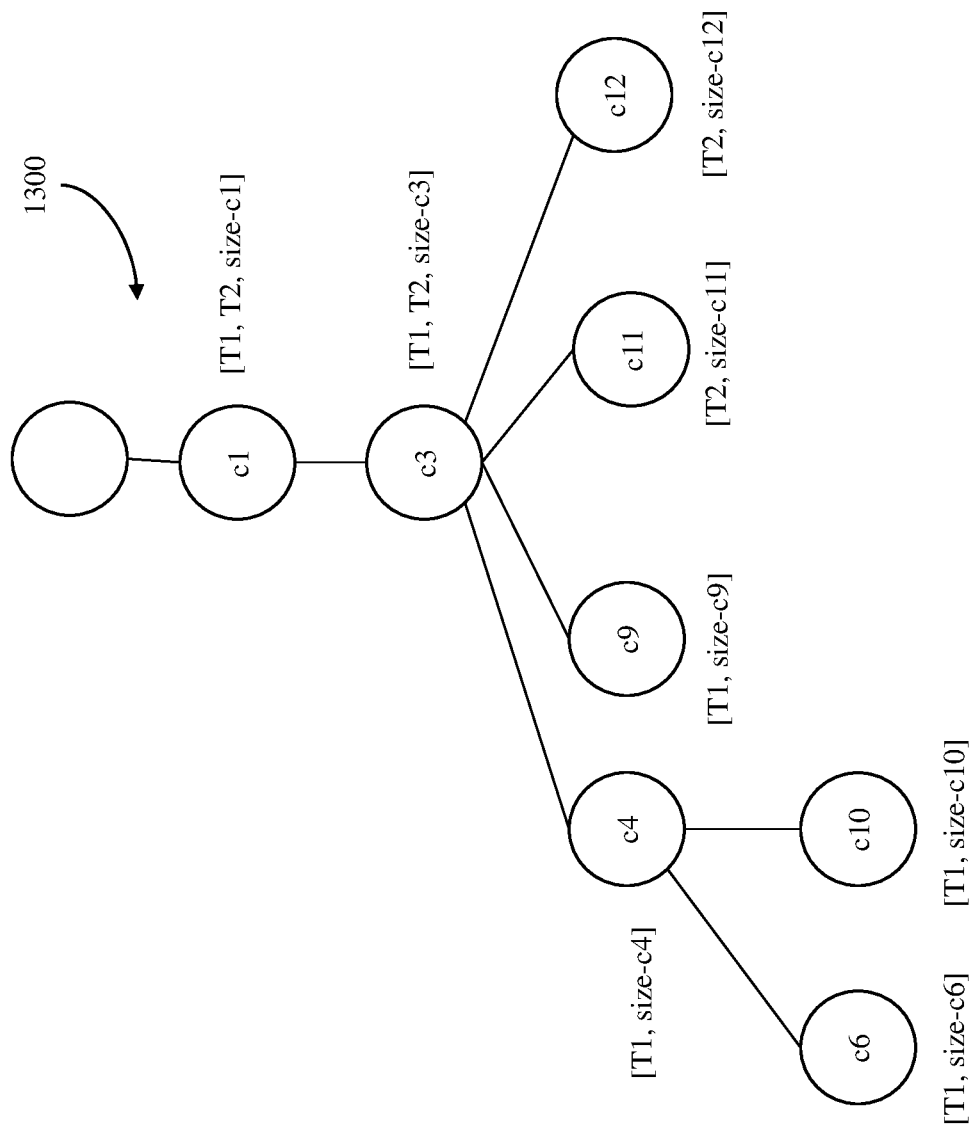
FIG. 13 shows a recomputed trie of the compressed trie shown in FIG. 12 assuming that a virtual machine has been migrated from the source site to one of the target sites in accordance with an embodiment of the invention.

As shown in FIG. 13, the recomputed trie 1300 now includes the node c6, which is the result of the assumption that the virtual machine vm-6 and the corresponding partial linked clone tree of the linked clone tree 1102 (i.e., the disk c6) have been migrated from the source site S1 to the target site T1. This recomputed trie 1300 is now used to determine if there is another virtual machine at the source site S1 that can be migrated to either the target site T1 or the target site T2 to save storage resources.

This process of selecting a virtual machine at the source site S1 to be migrated to a particular target site is repeated until the overall cost savings reaches a given threshold or there is no change between consecutive iterations. In some embodiments, after all the virtual machine to be migrated have been selected, the migration of those virtual machines is automatically initiated. In other embodiments, an option may be presented to an administrator of the cloud system 100 to manually initiate the virtual machine migrations.

Figure 14:
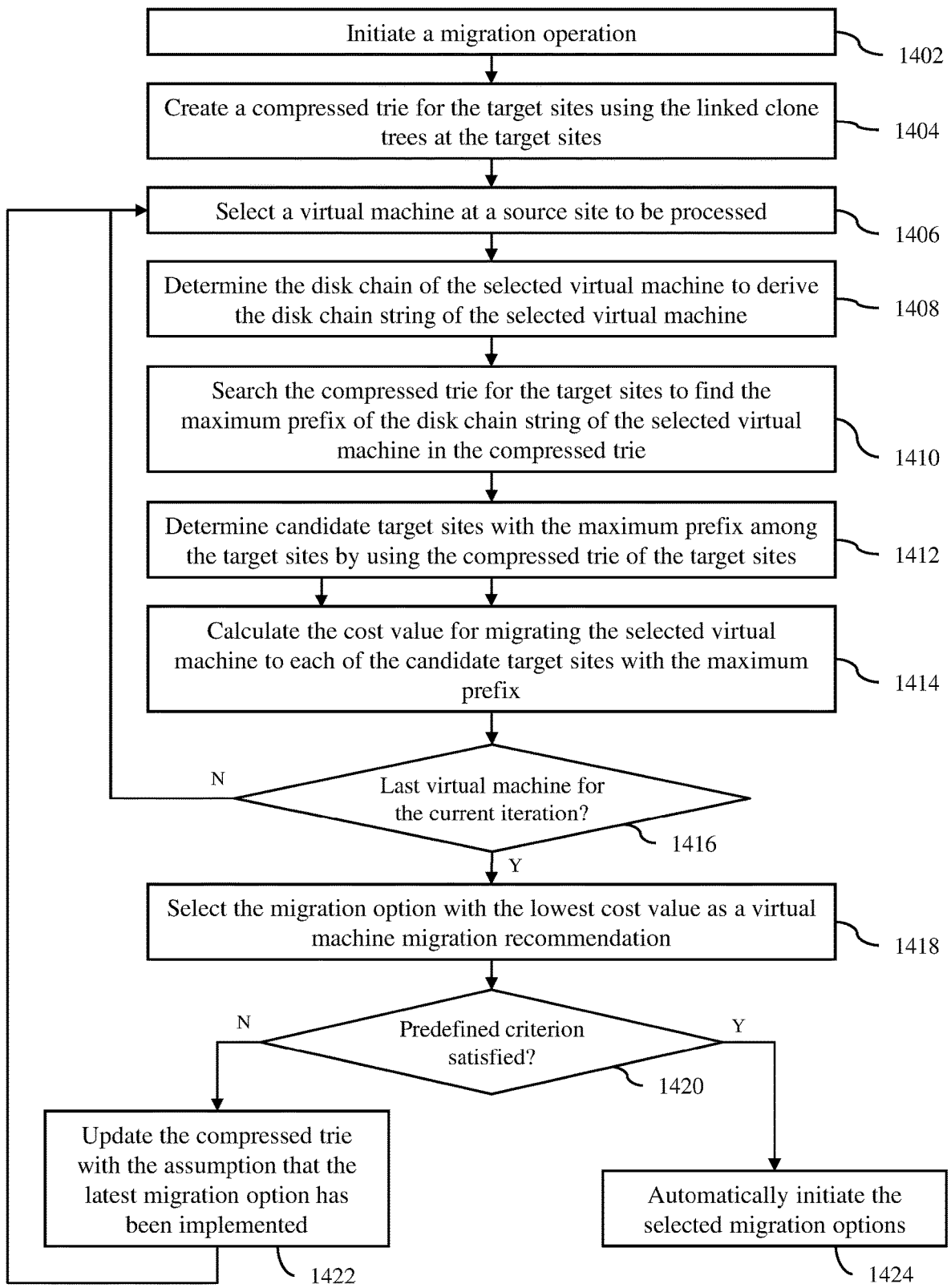
FIG. 14 is a flow diagram of an operation for migrating partial linked clone trees between sites in the cloud system in accordance with an embodiment of the invention.

An operation for migrating partial linked clone trees between sites in the cloud system 100 in accordance with an embodiment of the invention is described with reference to a process flow diagram shown in FIG. 14. The migration operation begins at block 1402, where the migration operation is initiated by the migration engine 134 for a source site and one or more target sites. In some embodiments, the migration operation may be initiated by the migration engine 134 based on a predefined schedule, e.g., every 24 hour, every 2 days or every week, for a particular combination of source and target sites. In other embodiments, the migration operation may be initiated in response to a request for migration operation, which may be from a software process running in the cloud system 100, such as a process running in a management server at a computing environment, e.g., a virtualization manager 126 in one of the private cloud computing environments 102, or from a user interface (UI) that allows an administrator to enter commands to initiate the migration operation.

Next, at step 1404, a compressed trie for the target sites is created using the linked clone trees at the target sites by the migration engine 134. An example of a compressed trie that can be created is illustrated in FIG. 12. As shown in FIG. 12, the compressed trie 1200 for the target sites T1 and T2 is created using the linked clone trees 1104 and 1106 at the target sites T1 and T2, which are shown in FIG. 11.

Next, at step 1406, a virtual machine at the source site is selected to be processed by the migration engine 134. In some embodiments, the virtual machine may be selected by a random process or based on the name of the virtual machine or the delta disk corresponding to the virtual machine (e.g., in alphanumerical order). In other embodiments, the virtual machine may be selected based on the levels of the linked clone tree at the source site. In these embodiments, each level of the linked clone tree at the source site is visited one at a time to select a delta disk corresponding to a virtual machine, starting from level 1 of the linked clone tree, which is one level higher than level 0 on which the root node of the linked clone tree is located. At each level of the linked clone tree, one of the virtual machines on that level may be selected by a random process or based on the name of the virtual machine or the delta disk corresponding to the virtual machine (e.g., in alphanumerical order). As an example, for the linked clone tree 1102 at the source site S1 shown in FIG. 11, the virtual machine vm-2 on level 1 of the linked clone tree 1102 is first selected to be processed.

Next, at step 1408, the disk chain of the selected virtual machine is determined by the migration engine 134 to derive the disk chain string of the selected virtual machine. As an example, the disk chain of the virtual machine vm-6 shown in FIG. 11 includes virtual disks c1, c3, c4 and c6. Thus, the disk chain string of the virtual machine vm-6 is "c1c3c4c6".

Next, at step 1410, the compressed trie for the target sites is searched by the migration engine 134 to find the maximum prefix of the disk chain string of the selected virtual machine in the compressed trie. As an example, the maximum prefix of the disk chain string "c1c3c4c6" of the virtual machine vm-6 shown in FIG. 11 that can be found in the compressed trie 1200 of the target sites T1 and T2 is "c1c3", which is shown in FIG. 12.

Next, at step 1412, candidate target sites with the maximum prefix among the target sites are determined by the migration engine 134 by using the compressed trie of the target sites. In an embodiment, the last node of the nodes in the compressed trie of the possible target sites that correspond to the maximum prefix includes a list of target sites (which may include only one target site), where the nodes of the maximum prefix are present. As an example, in the compressed trie 1200 shown in FIG. 12, the last node "c4" of the nodes c1, c3 and c4 that correspond to the maximum prefix "c1c3c4" of the disk chain string "c1c3c4c6" of the virtual machine vm-6 shown in FIG. 11 includes the target site T1, where the nodes c1, c3 and c4 of the maximum prefix "c1c3c4" are present.

Next, at step 1414, the cost value for migrating the selected virtual machine to each of the candidate target sites with the maximum prefix is calculated by the migration engine 134. In an embodiment, these cost values are computed using the cost function cost (vm, s, t). However, in other embodiments, the cost values may be computed using a different function or equation to compute the storage costs of migrating the selected virtual machine to each of the target sites with the maximum prefix.

Next, at step 1416, a determination is made by the migration engine 134 whether the current virtual machine is the last virtual machine to be processed for the source site for this iteration. If the current virtual machine is not the last virtual machine, then the operation proceeds back to step 1406, where the next virtual machine to be processed is selected from the linked clone tree. However, if the current virtual machine is the last virtual machine for the current iteration, then the operation proceeds to step 1418, where the migration option with the lowest cost value is selected as a virtual machine migration recommendation. As an example, for the linked clone tree 1102 at the source site S1 shown in FIG. 11, the migration option with the lowest cost value is the migration of the virtual machine vm-6 to the target site T1, as previously described.

Next, at step 1420, a determination is made by the migration engine 134 whether a predefined criterion has been satisfied. In some embodiments, the predefined criterion involves a threshold for the total cost savings. In these embodiments, if the accumulated cost savings has met or exceeded a threshold, then the predefined criterion has been satisfied. In other embodiments, the predefined criterion involves the cost saving change in the current iteration. In these embodiments, if there is no cost savings in the current iteration, then the predefined criterion has been satisfied.

If the predefined criterion has not been satisfied, the operation proceeds to step 1422, where the compressed trie of the target sites is updated by the migration engine 134 with the assumption that the latest migration option has been implemented. That is, the current compressed trie is updated as if the virtual machine and a corresponding partial linked clone tree (i.e., the virtual disks of the virtual machine not found at the target site), as specified in the latest migration option, have been migrated to the target site, as specified in the latest migration option. An example of an updated compressed trie is illustrated in FIG. 13, where the virtual machine vm-6 has been assumed to have been migrated to the target site T1. The operation then proceeds back to step 1406 to execute another iteration with the updated compressed trie.

However, if the predefined criterion has been satisfied, the operation proceeds to step 1424, where the selected migration options are automatically initiated by the migration engine 134. In some embodiments, the migration of the selected virtual machines and their corresponding partial linked clone trees to one or more target sites from the source site is executed by one or more of the hybrid cloud managers 130 in the private cloud computing environments 102 and/or one or more of the hybrid cloud directors 160 in the public cloud computing environments 104. In other embodiments, the migration of the selected virtual machines and their corresponding partial linked clone trees to one or more target sites from the source site may be executed by one or more other components in the cloud system 100 that are responsible for such operations.

In an alternative embodiment, the selected migration options are presented to a user, e.g., an administrator, in a user interface by the migration engine 134 so that the user can manually initiate the migration options. This alternative embodiment gives control to the user to either implement or ignore the virtual machine migration recommendations.

The migration operation described above may be implemented using different algorithms. A pseudo-code for a particular implementation of the migration operation in accordance with an embodiment of the invention is shown below.

The input to the algorithm is the linked clone tree at the source site, the source site, the target sites and the cost savings threshold, which is the predefined criterion in this algorithm.
Function MigratePartialTree(tree, source, targets, costSavingsThreshold)

1. migrateRecommendations = [ ]
2. costSavings = 0
3. costs = [ ]
4. For each vm in tree
   a. maxPrefixChain, targetSites = trieLookup(vm.diskChain)
   b. cost,target = findCost(maxPrefixChain, source, targets)
   c. costs.add(vm, cost, target)
5. vm, cost, target = findMinCost(costs)
6. If (cost >= 0) return migrateRecommendations
7. costSavings = costSavings + cost
8. migrateRecommendations.add(vm, cost, target)
9. If (costSavings <= costSavingsThreshold) return migrateRecommendations
10. recomputetrie(vm, target)
11. removeVM(vm, tree)
12. Go to step 3

Note:
findCost function returns an arbitrary target in case of ties.

It is noted here that although the migration operation has been described using linked clone tree structures as an example, the migration operation according to embodiments of the invention may be applied to other tree structures having parent-child virtual disk hierarchies and virtual computing instances other than virtual machines, such as virtual containers. In addition, as previously noted, the described migration operation may be applied to migration of partial linked clone tree structures between any cloud computing environments, such as one private cloud computing environment to another private cloud computing environment, or one public cloud computing environment to another public cloud computing environment.

Figure 15:
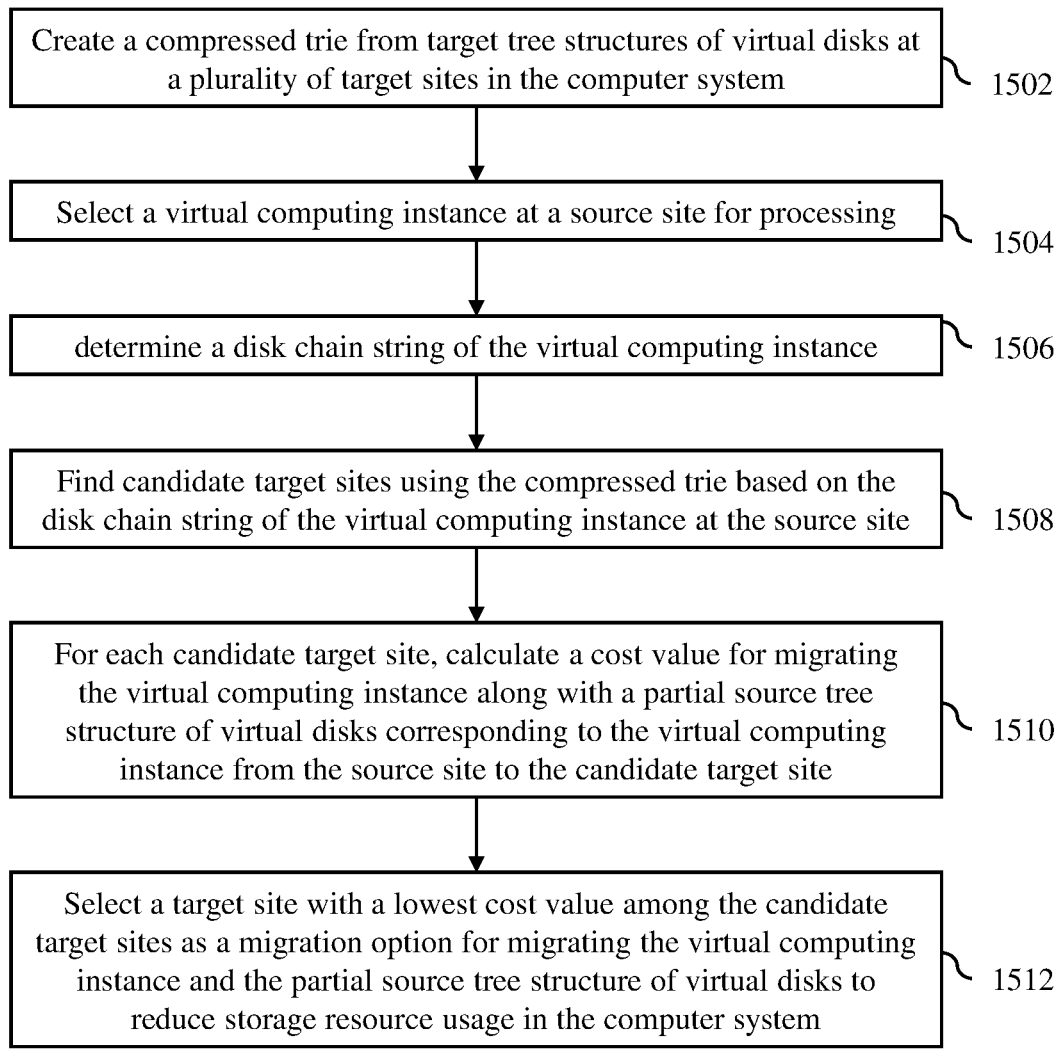
FIG. 15 is a process flow diagram of a computer-implemented method for migrating partial tree structures of virtual disks for virtual computing instances between sites in a computer system in accordance with an embodiment of the invention.

A computer-implemented method for migrating partial tree structures of virtual disks for virtual computing instances from a source site to at least one target site in a computer system, such as the cloud system 100, in accordance with an embodiment of the invention is described with reference to a process flow diagram of FIG. 15. At block 1502, a compressed trie is created from target tree structures of virtual disks at a plurality of target sites in the computer system. In some embodiments, the target tree structures are linked clone trees of virtual machines. At block 1504, a virtual computing instance at the source site is selected for processing. At block 1506, a disk chain string of the virtual computing instance is determined. The disk chain string includes identifiers of virtual disks in a source tree structure at the source site that form a disk chain from a root node disk to a leaf node disk corresponding to the virtual computing instance. At block 1508, candidate target sites are found using the compressed trie based on the disk chain string of the virtual computing instance at the source site. At block 1510, for each candidate target site, a cost value for migrating the virtual computing instance along with a partial source tree structure of virtual disks from the source site to the candidate target site is calculated. At block 1512, a target site with a lowest cost value among the candidate target sites is selected as a migration option for migrating the virtual computing instance and the partial source tree structure to reduce storage resource usage in the computer system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for migrating partial tree structures of virtual disks for virtual computing instances between sites in a computer system, the method comprising:
creating a compressed trie from target tree structures of virtual disks at a plurality of target sites in the computer system;
selecting a virtual computing instance at a source site for processing;
determining a disk chain string of the virtual computing instance, wherein the disk chain string includes identifiers of virtual disks in a source tree structure at the source site that form a disk chain from a root node disk to a leaf node disk corresponding to the virtual computing instance;
finding candidate target sites using the compressed trie based on the disk chain string of the virtual computing instance at the source site;
for each candidate target site, calculating a cost value for migrating the virtual computing instance along with a partial source tree structure of virtual disks corresponding to the virtual computing instance from the source site to the candidate target site; and
selecting a target site with a lowest cost value among the candidate target sites as a migration option for migrating the virtual computing instance and the partial source tree structure of virtual disks to reduce storage resource usage in the computer system.

2. The method of claim 1, wherein finding the candidate target sites comprises:
searching the compressed trie for a maximum prefix of the disk chain string of the virtual computing instance; and
identifying the target sites with the maximum prefix in the compressed trie as the candidate target sites.

3. The method of claim 1, further comprising, after selecting the target site, updating the compressed trie to an updated compressed trie in which the virtual computing instance and the partial source tree structure of virtual disks are assumed to have been migrated to the target site.

4. The method of claim 3, further comprising:
selecting a next virtual computing instance at the source site for processing;
determining a disk chain string of the next virtual computing instance;
searching the updated compressed trie for a maximum prefix of the disk chain string of the next virtual computing instance;
identifying new candidate target sites with the maximum prefix of the disk chain string of the next virtual computing instance among the plurality of target sites using the updated compressed trie;
for each new candidate target site, calculating a cost value for migrating the next virtual computing instance along with another partial source tree structure of virtual disks from the source site to the new candidate target site; and
selecting a next target site with a lowest cost value among the new candidate target sites as a next migration option for migrating the next virtual computing instance and the another partial source tree structure of virtual disks.

5. The method of claim 1, wherein the compressed trie include at least one node that includes a field for one or more target sites at which a virtual disk corresponding to the node appears.

6. The method of claim 1, wherein the cost value for migrating the virtual computing instance along with the partial source tree structure of virtual disks is calculated using an equation based on additional storage costs incurred at a particular candidate target site due to migration of the virtual computing instance to the particular candidate target site, cost savings at the source site due to removal of the virtual computing instance from the source site, and any cost savings due to disk consolidation at the source site made possible by a removal of the virtual computing instance from the source site.

7. The method of claim 6, wherein the additional storage costs incurred at the particular candidate target site due to migration of the virtual computing instance to the particular candidate target site includes storage costs associated with one or more virtual disks at the source site that are exclusive used by the virtual computing instance and that are needed to be copied to the particular candidate target site to migrate the virtual computing instance to the particular candidate target site and wherein the cost savings at the source site due to the removal of the virtual computing instance includes cost savings associated with removal of the one or more virtual disks from the source site due to the migration of the virtual computing instance to the particular candidate target site.

8. The method of claim 7, wherein the cost savings due to disk consolidation at the source site includes cost savings associated with consolidating virtual disks at the source site to one or more new virtual disks after the removal of the one or more virtual disks from the source site due to the migration of the virtual computing instance to the particular candidate target site.

9. The method of claim 6, wherein the equation for calculating the cost value for migrating the virtual computing instance to the particular candidate target site is as follows:

$$\text{cost}(vm, s, t) = \sum_{i=m}^{n} diskCost(c_i, t) - \sum_{j=p}^{q} diskCost(c_j, s) - \emptyset(vm),$$

where vm is the virtual computing instance, s is the source site, t is the particular candidate target site, $c_i$ is a disk in a disk chain at the target site, $c_j$ is a disk in the disk chain at the source site, diskCost is a function that computes a disk cost by multiplying storage cost per storage unit at a given site by size of a disk being considered, and $\emptyset(vm)$ is the cost savings due to disk consolidation at the source site by the removal of the virtual computing instance.

10. A non-transitory computer-readable storage medium containing program instructions for migrating partial tree structures of virtual disks for virtual computing instances between sites in a computer system, wherein execution of the program instructions by one or more processors causes the one or more processors to perform steps comprising:
creating a compressed trie from target tree structures of virtual disks at a plurality of target sites in the computer system;
selecting a virtual computing instance at a source site for processing;
determining a disk chain string of the virtual computing instance, wherein the disk chain string includes identifiers of virtual disks in a source tree structure at the source site that form a disk chain from a root node disk to a leaf node disk corresponding to the virtual computing instance;

finding candidate target sites using the compressed trie based on the disk chain string of the virtual computing instance at the source site;

for each candidate target site, calculating a cost value for migrating the virtual computing instance along with a partial source tree structure of virtual disks corresponding to the virtual computing instance from the source site to the candidate target site; and selecting a target site with a lowest cost value among the candidate target sites as a migration option for migrating the virtual computing instance and the partial source tree structure of virtual disks to reduce storage resource usage in the computer system.

11. The non-transitory computer-readable storage medium of claim 10, wherein finding the candidate target sites comprises:

searching the compressed trie for a maximum prefix of the disk chain string of the virtual computing instance; and identifying the target sites with the maximum prefix in the compressed trie as the candidate target sites.

12. The non-transitory computer-readable storage medium of claim 10, wherein the steps further comprise, after selecting the target site, updating the compressed trie to an updated compressed trie in which the virtual computing instance and the partial source tree structure of virtual disks is assumed to have been migrated to the target site.

13. The non-transitory computer-readable storage medium of claim 12, wherein the steps further comprise:

selecting a next virtual computing instance at the source site for processing;

determining a disk chain string of the next virtual computing instance;

searching the updated compressed trie for a maximum prefix of the disk chain string of the next virtual computing instance;

identifying new candidate target sites with the maximum prefix of the disk chain string of the next virtual computing instance among the plurality of target sites using the updated compressed trie;

for each new candidate target site, calculating a cost value for migrating the next virtual computing instance along with another partial source tree structure of virtual disks from the source site to the new candidate target site; and selecting a next target site with a lowest cost value among the new candidate target sites as a next migration option for migrating the next virtual computing instance and the another partial source tree structure of virtual disks.

14. The non-transitory computer-readable storage medium of claim 10, wherein the compressed trie include at least one node that includes a field for one or more target sites at which a virtual disk corresponding to the node appears.

15. The non-transitory computer-readable storage medium of claim 10, wherein the cost value for migrating the virtual computing instance along with the partial source tree structure of virtual disks is calculated using an equation based on additional storage costs incurred at a particular candidate target site due to migration of the virtual computing instance to the particular candidate target site, cost savings at the source site due to removal of the virtual computing instance from the source site, and any cost savings due to disk consolidation at the source site made possible by a removal of the virtual computing instance from the source site.

16. The non-transitory computer-readable storage medium of claim 15, wherein the additional storage costs incurred at the particular candidate target site due to migration of the virtual computing instance to the particular candidate target site includes storage costs associated with one or more virtual disks at the source site that are exclusive used by the virtual computing instance and that are needed to be copied to the particular candidate target site to migrate the virtual computing instance to the particular candidate target site and wherein the cost savings at the source site due to the removal of the virtual computing instance includes cost savings associated with removal of the one or more virtual disks from the source site due to the migration of the virtual computing instance to the particular candidate target site.

17. The non-transitory computer-readable storage medium of claim 16, wherein the cost savings due to disk consolidation at the source site includes cost savings associated with consolidating virtual disks at the source site to one or more new virtual disks after the removal of the one or more virtual disks from the source site due to the migration of the virtual computing instance to the particular candidate target site.

18. The non-transitory computer-readable storage medium of claim 15, wherein the equation for calculating the cost value for migrating the virtual computing instance to the particular candidate target site is as follows:

$$\text{cost}(vm, s, t) = \sum_{i=m}^{n} diskCost(c_i, t) - \sum_{j=p}^{q} diskCost(c_j, s) - \emptyset(vm),$$

where vm is the virtual computing instance, s is the source site, t is the particular candidate target site, $c_i$ is a disk in a disk chain at the target site, $c_j$ is a disk in the disk chain at the source site, diskCost is a function that computes a disk cost by multiplying storage cost per storage unit at a given site by size of a disk being considered, and $\emptyset(vm)$ is the cost savings due to disk consolidation at the source site by the removal of the virtual computing instance.

19. A system comprising:

memory; and one or more processors configured to:

create a compressed trie from target tree structures of virtual disks at a plurality of target sites in a computer system;

select a virtual computing instance at a source site for processing;

determine a disk chain string of the virtual computing instance, wherein the disk chain string includes identifiers of virtual disks in a source tree structure at the source site that form a disk chain from a root node disk to a leaf node disk corresponding to the virtual computing instance;

find candidate target sites using the compressed trie based on the disk chain string of the virtual computing instance at the source site;

for each candidate target site, calculate a cost value for migrating the virtual computing instance along with a partial source tree structure of virtual disks corresponding to the virtual computing instance from the source site to the candidate target site; and select a target site with a lowest cost value among the candidate target sites as a migration option for migrating the virtual computing instance and the partial source tree structure of virtual disks to reduce storage resource usage in the computer system.

20. The system of claim 19, wherein the one or more processors are configured to:
search the compressed trie for a maximum prefix of the disk chain string of the virtual computing instance; and
identify the target sites with the maximum prefix in the compressed trie as the candidate target sites.

21. The system of claim 19, wherein the one or more processors are configured to, after the target site has been selected, update the compressed trie to an updated compressed trie in which the virtual computing instance and the partial source tree structure of virtual disks are assumed to have been migrated to the target site.

22. The system of claim 21, wherein the one or more processors are configured to:
select a next virtual computing instance at the source site for processing;
determine a disk chain string of the next virtual computing instance;
search the updated compressed trie for a maximum prefix of the disk chain string of the next virtual computing instance;
identify new candidate target sites with the maximum prefix of the disk chain string of the next virtual computing instance among the plurality of target sites using the updated compressed trie;
for each new candidate target site, calculate a cost value for migrating the next virtual computing instance along with another partial source tree structure of virtual disks from the source site to the new candidate target site; and
select a next target site with a lowest cost value among the new candidate target sites as a next migration option for migrating the next virtual computing instance and the another partial source tree structure of virtual disks.

23. The system of claim 19, wherein the cost value for migrating the virtual computing instance along with the partial source tree structure of virtual disks is calculated using an equation based on additional storage costs incurred at a particular candidate target site due to migration of the virtual computing instance to the particular candidate target site, cost savings at the source site due to removal of the virtual computing instance from the source site, and any cost savings due to disk consolidation at the source site made possible by a removal of the virtual computing instance from the source site.

* * * * *